United States Patent Office 3,511,855
Patented May 12, 1970

3,511,855
PRODUCTION OF β-LACTONES
Franz Merger, Ludwigshafen (Rhine), Hugo Kroeper, Heidelberg, and Rolf Platz, Mannheim, Germany, assignors to Badische Anilin- & Soda-Fabrik Aktiengesellschaft, Ludwigshafen (Rhine), Germany
No Drawing. Filed Mar. 14, 1967, Ser. No. 622,887
Claims priority, application Germany, Mar. 16, 1966, 1,568,090
Int. Cl. C07d 3/00
U.S. Cl. 260—343.9                              7 Claims

ABSTRACT OF THE DISCLOSURE

Production of β-lactones by heating carboxylic acid esters of β-hydroxycarboxylic acids of the general formula

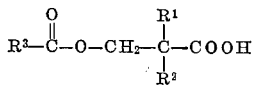

where $R^1$ and $R^2$ are aliphatic, cycloaliphatic, araliphatic or aromatic hydrocarbon radicals and, jointly, may be members of a five- or six-membered cycloaliphatic ring, and $R^3$ is a hydrogen atom or an aliphatic, cycloaliphatic, araliphatic or aromatic hydrocarbon radical to temperatures of 150 to 350° C. in the presence of catalysts, e.g. oxides of elements of Groups III–A, IV–A and IV–B of the Periodic Chart of the Elements, phosphates of metals of Group III–A of the Periodic Chart of the Elements or silicates of metals of Groups I–A, II–A and III–A of the Periodic Chart of the Elements. The reaction may be carried out in the gas or liquid phase. The resultant β-lactones are suitable for the manufacture of polymers.

---

This invention relates to a process for the manufacture of β-lactones from carboxylic acid esters of β-hydroxycarboxylic acids.

It is known from Houben-Weyl, "Methoden der organischen Chemie," Stuttgart, 1963, vol. 6/2, p. 517, and British Pats. 982,904 and 1,053,607 that β-lactones may be prepared from β-halopropionic acid by elimination of hydrogen halide with basic materials, such as sodium carbonate or lead oxide. This process does not give good yields unless the expensive bromine compound is used. Moreover, the process is costly owing to the loss of halogen.

Moreover, according to Houben-Weyl, loc. cit., elimination of water from β-hydroxyfatty acid, especially where a primary alcohol group is present, in most cases does not result in β-lactones, but in α,β-unsaturated fatty acids. In α,α-disubstituted β-hydroxyfatty acids cleavage of the α,β-carbon bond occurs.

It is furthermore known from U.S. Pat. 3,028,399 that β-lactones may be obtained by diazotizing β-aminofatty acids in dilute acetic acid. A disadvantage is that β-aminofatty acids are not readily accessible.

According to another process described in Houben-Weyl, loc. cit., p. 520, and in U.S. Pat. 3,000,906, β-lactones can be prepared from substituted ketenes by reacting them with aldehydes or ketones. However, the substituted ketenes are not readily accessible and the dimeric ketenes formed in the reaction are difficult to separate from the β-lactones.

A further method that leads to β-lactones is the reaction of α,α-disubstituted β-hydroxyfatty acids with thionyl chloride described in J. Org. Chem., vol. 25, 1812 (1960). This process, however, has acquired no industrial importance owing to its low yields.

It is an object of the present invention to provide a process for the production of β-lactones. Another object is to provide a process by which β-lactones are obtained in good yields from readily accessible starting materials. A further object is to provide a process by which difficultly accessible β-lactones are obtained in a simple manner. Yet another object is to provide a process by which β-lactones may be prepared continuously.

In accordance with this invention these and other objects and advantages of the invention are achieved and β-lactones of the general formula

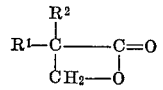

where $R^1$ and $R^2$ are aliphatic, cycloaliphatic, araliphatic or aromatic hydrocarbon radicals and, jointly, may be members of a five- or six-membered cycloalkane ring are obtained by contacting carboxylic acid esters of β-hydroxycarboxylic acids of the general formula

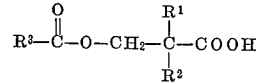

where $R^1$ and $R^2$ have the meanings given above and $R^3$ is a hydrogen atom or an aliphatic, cycloaliphatic, araliphatic or aromatic hydrocarbon radical with oxides of elements of Group III–A, IV–A or IV–B of the Periodic Chart of the Elements, phosphates of metals of Group III–A of the Periodic Chart of the Elements or silicates of metals of Group I–A, II–A or III–A of the Periodic Chart of the Elements at temperatures of from 150 to 350° C.

The process is based on the discovery that carboxylic acid esters of β-hydroxycarboxylic acids decompose at elevated temperature in the presence of catalysts into β-lactones and the corresponding carboxylic acids. For example, β-acetoxypivalic acid eliminates acetic acid, yielding pivalolactone. The reaction may be represented by the following equation:

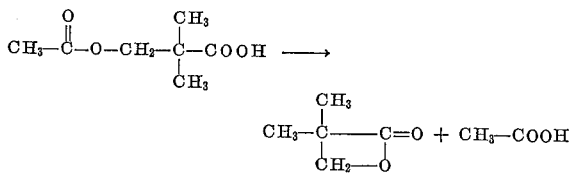

In the preferred starting materials II, $R^1$ and $R^2$ are aliphatic, cycloaliphatic, araliphatic or aromatic hydrocarbon radicals having up to 12 carbon atoms, e.g. methyl, ethyl, isopropyl, butyl, octyl, dodecyl, cyclohexyl, benzyl and phenyl, particularly alkyl radicals having from 1 to 4 carbon atoms. In the preferred starting materials II $R^1$ and $R^2$ are joined together to form members of a five- or six-membered cycloalkane ring. $R^3$ in the preferred starting materials II is a hydrogen atom or an aliphatic, cycloaliphatic, araliphatic or aromatic hydrocarbon radical having up to 8 carbon atoms, e.g. methyl, ethyl, isopropyl, hexyl, octyl, cyclohexyl, benzyl and phenyl, especially an alkyl radical having from 1 to 4 carbon atoms. The preferred starting materials II are obtained by esterifying β-hydroxycarboxylic acids with carboxylic acids, especially lower fatty acids, by conventional methods. Esters of β-hydroxycarboxylic acids with acetic acid are preferred. Examples of compounds amenable to the reaction are β-acetoxypivalic acid, α,α-diethyl-β-acetoxypropionic acid, α-methyl - α - phenyl-β-acetoxypropionic acid, α,α′-diethyl-β-acetoxybutyric acid, α-benzyl-α-methyl-β-acetoxypropionic acid, α-methyl-α-propyl-β-acetoxypropionic acid and α-ethyl-α-phenyl-β- acetoxypropionic acid, β-acetoxypivalic being particularly preferred owing to its ready availability.

It is also possible to start with a mixture of carboxylic acids, e.g. acetic acid and β-hydroxycarboxylic acids, which react to form the starting materials II intermediately.

Preferred catalysts are oxides of elements of Groups III–A, IV–A and IV–B of the Periodic Chart of the Elements, e.g. silicon dioxide, titanium dioxide, zirconium dioxide, aluminium oxide and boric acid anhydride, phosphates of metals of Group III–A of the Periodic Chart of the Elements, e.g. aluminium phosphate, and silicates of metals of Groups I–A, II–A and III–A of the Periodic Chart of the Elements, e.g. sodium aluminium silicate, magnesium silicate, calcium magnesium silicate and aluminium silicate. Mixtures of the said catalysts may also be used. It is advantageous to use the catalysts in a form in which they have a large surface area, e.g. as porous structures or in finely divided form.

The reaction is carried out at temperatures of 150 to 350° C. Particularly good results are obtained by using temperatures between 170 and 300° C.

The starting materials II may be contacted with the catalysts in liquid form or dissolved in an inert solvent such as benzene or cyclohexane. It is however preferable to carry out the reaction in the gas phase by passing the vapors of the starting materials over the catalyst. The vapors may be diluted with inert gases such as nitrogen or carbon dioxide. The necessary pressure depends on the boiling point of the starting material II and the reaction temperature.

The process of the invention may for example be carried out by vaporizing the carboxylic acid ester of the β-hydroxycarboxylic acid in vacuo and contacting the vapor, if desired diluted with inert gas, at the temperatures and with the catalysts specified. The vapors are advantageously passed over a stationary bed of porous catalyst, or through a bed of finely divided catalyst in such a way that this is kept in fluidized motion, and then condensed. The condensate is fractionally distilled, the β-lactone being separated and the carboxylic acid which is eliminated being returned to the esterification stage. The unreacted starting materials II are again passed over the catalyst.

β-Lactones obtained by the process of this invention are valuable starting materials for the production of polymers (cf. for example H. Mark and S. Whitby, "High Polymers," vol. I, "The Collected Papers of Wallace H. Carothers," New York, 1940).

The invention is further illustrated by the following examples in which the parts are by weight unless otherwise specified. Parts by volume bear the same relation to parts by weight as the liter (S.T.P.) to the kilogram.

EXAMPLE 1

120 parts by volume of titanium dioxide (anatase; particle size 0.1 to 0.3 mm.) is heated to 280 to 282° C. in an electrically heated fluidized-bed reactor. While maintaining the said temperature and a pressure of 12 to 15 mm. Hg, 800 parts of β-acetoxypivalic acid is passed through the intensely fluidized catalyst in the course of six hours via a quartz evaporator. The bulk of the reaction mixture that escapes is condensed in an air-cooled receiving flask, the remainder being collected in two condensers arranged after the same. The crude product is fractionated through a column and the desired pivalolactone boiling at 64° C./30 mm. is obtained in addition to acetic acid and unreacted starting material. The yield is 65% of the theory, based on β-acetoxypivalic acid reacted.

In the following examples β-acetoxypivalic acid is reacted as described in Example 1 in the presence of different catalysts.

| Example | Catalyst | Particle size, mm. | Temp., °C. | Pressure mm. Hg | Yield percent |
|---|---|---|---|---|---|
| 2 | γ-Al₂O₃ (from boehmite) | 0.06–0.3 | 230–240 | 14–16 | 64.5 |
| 3 | γ/η-Al₂O₃ (from bayerite) | 0.03–0.5 | 220–230 | 10–12 | 63 |
| 4 | ε-Al₂O₃ | 0.2–0.4 | 260 | 10–12 | 47 |
| 5 | AlPO₄·½ Al₂O₃ | 0.1–0.4 | 240–250 | 8–10 | 62.5 |
| 6 | γ-Al₂O₃/ZrO₂ (20%) | 0.1–0.4 | 250 | 12–15 | 58 |

EXAMPLE 7

β-Formyloxypivalic acid is passed as described in Example 1 at 240° C. and 10 mm. Hg through a fluidized bed of γ-Al₂O₃ (boehmite). Analysis of the infrared spectrum of the resultant product mixture shows the carbonyl band of pivalolactone at 5.5μ. Pivalolactone is isolable by fractionation.

EXAMPLE 8

100 parts of α-methyl-α-n-propyl-β-acetoxypropionic acid is passed as described in Example 1 in the course of an hour at 270–280° C. and 5 mm. Hg through a fluidized bed of 120 parts by volume of TiO₂ (anatase). 41 parts of α-methyl-α-n-propyl-β-propiolactone is obtained by fractional distillation of the reaction product. The yield is 71% of the theory.

EXAMPLE 9

170 parts of α-methyl-α-n-propyl-β-acetoxypropionic acid is passed as described in Example 1 in the course of two hours at 220–224° C. and 5 mm. Hg through a fluidized bed of 120 parts by volume of γ-Al₂O₃ (boehmite). 62.5 parts of α-methyl-α-n-propyl-β-propiolactone is obtained by fractional distillation. The yield is 67% of the theory (62.5 parts by weight and 26 parts by weight of starting material.

EXAMPLE 10

60 parts of 1-(acetoxymethyl)-cyclohexanecarboxylic acid is passed as described in Example 1 in the course of 30 minutes at 230–240° C. and 3 mm. Hg through a fluidized bed of 120 parts by volume of γ-Al₂O₃ (boehmite). 2-oxa-4-spiro-(3,5)-nonanone-(1) boiling at 93° C./3 mm. is obtained by fractional distillation of the reaction product in a yield of 55% of the theory.

EXAMPLE 11

50 parts of α-phenyl-α-ethyl-α,β-acetoxypropionic acid is passed as described in Example 1 in the course of 30 minutes at 270–280° C. and 3 mm. Hg through a fluidized bed of 120 parts by volume of TiO₂ (anatase). α-phenyl-α-ethyl-β-propiolactone boiling at 96° C./1 mm. is obtained by fractionation of the reaction product.

We claim:

1. A process for the production of a β-lactone of the formula

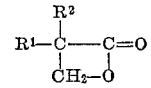

wherein $R^1$ and $R^2$ taken separately represent a substituent selected from the class consisting of alkyl of 1 to 12 carbon atoms, cyclohexyl, phenyl and benzyl, and when taken jointly, represent the divalent alkylene group of a five to six membered cycloalkane ring, which process comprises contacting a carboxylic acid ester of a β-hydroxycarboxylic acid of the formula

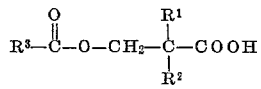

wherein $R^1$ and $R^2$ have the meanings given above and $R^3$ is a substituent selected from the class consisting of hydrogen, alkyl of 1 to 8 carbon atoms, cyclohexyl, phenyl and benzyl, with at least one catalyst selected from the the class consisting of oxides of elements of Group III–A, IV–A and IV–B of the Periodic Chart of the Elements, phosphates of metals of Group III–A of the Periodic Chart of the Elements and silicates of metals of Groups I–A, II–A and III–A of the Periodic Chart of the Elements, at temperatures of from 150° C. to 350° C.

2. A proces as claimed in claim 1 wherein said carboxylic acid ester of a β-hydroxycarboxylic acid has the Formula II wherein $R^1$ and $R^2$ each represents alkyl of from 1 to 4 carbon atoms.

3. A process as claimed in claim 1 wherein said carboxylic acid ester of a β-hydroxycarboxylic acid has the Formula II wherein $R^3$ represents alkyl of from 1 to 4 carbon atoms.

4. A process as claimed in claim 1 wherein the compound of the Formula II is β-acetoxypivalic acid.

5. A process as claimed in claim 1 wherein said catalyst is an oxide of a metal selected from the class consisting of the metals of Groups III–A, IV–A and IV–B of the Periodic Chart of the Elements.

6. A process as claimed in claim 1 wherein said process is carried out in the gas phase.

7. A process as claimed in claim 1 wherein said process is carried out at temperatures of 170° C. to 300° C.

References Cited

FOREIGN PATENTS 1,478,258   5/1966   France.

ALEX MAZEL, Primary Examiner

A. M. T. TIGHE, Assistant Examiner

U.S. Cl. X.R.

260—476, 488, 468